(12) United States Patent
Lattimore et al.

(10) Patent No.: US 6,243,776 B1
(45) Date of Patent: Jun. 5, 2001

(54) SELECTABLE DIFFERENTIAL OR SINGLE-ENDED MODE BUS

(75) Inventors: George McNeil Lattimore; Robert James Reese; Gus Wai-Yan Yeung, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/114,116

(22) Filed: Jul. 13, 1998

(51) Int. Cl.[7] ............................................... G06F 13/00
(52) U.S. Cl. ........................ 710/104; 710/106; 710/127
(58) Field of Search ................................... 710/104, 126, 710/127, 128, 129, 105, 106

(56) References Cited

U.S. PATENT DOCUMENTS

| | | |
|---|---|---|
| 4,864,291 | 9/1989 | Korpi . |
| 5,715,409 | 2/1998 | Bucher et al. . |
| 5,758,109 | * 5/1998 | Gafford et al. ..................... 710/128 |

OTHER PUBLICATIONS

IBM TDB "State Machine For SCSI Bus Translation", vol. 32, No. 9A, Feb. 1990, pp. 152–155.

* cited by examiner

*Primary Examiner*—Robert Beausoleil
*Assistant Examiner*—X. Chung-Trans
(74) *Attorney, Agent, or Firm*—Leslie A. Van Leeuwen

(57) ABSTRACT

A bus may be configured as either a single-ended mode bus or as a differential mode bus, depending on the system environment. The bus is configured in such a way that additional lines are not required, and so that substantially the same circuitry may be used for either single-ended mode or differential mode. Further, a selectable-mode driver may be connected to a non-selectable mode receiver, and vice versa. The invention may be implemented as a selectable driver, a selectable receiver, or a selectable driver/receiver pair. The apparatus and method of the present invention apply to both uni-directional and bi-directional bus implementations. The invention uses the same bus lines (i.e. wires) and substantially the same circuitry for both single-ended and differential modes of operation. When operating in single-ended mode, the data width of the bus is twice the data width as when operating in differential mode.

10 Claims, 5 Drawing Sheets

SELECTABLE DIFFERENTIAL OR SINGLE-ENDED MODE BUS

FIELD OF THE INVENTION

The present invention relates to configuring a system bus, and, more particularly, to a method and apparatus for selecting a driver/bus/receiver combination which can be used in either differential mode, or in single-ended mode, with twice the data width as compared to the differential mode.

BACKGROUND OF THE INVENTION

In processor bus design, two types of electric interface protocols are typically used. When a bus is configured according to a single-ended protocol, a single wire, or line, is needed for each bit which is transmitted on the bus. The wires are referenced to a common ground. A signal is considered "active" if the voltage measured on the line is greater than (or less than, in the case of negative active logic) a certain voltage level, as measured with respect to ground. The signal is considered "inactive" if the voltage measured on the line is less than (or greater than, in the case of negative active logic) a certain different voltage level, as measured with respect to ground. When a bus is configured according to a differential protocol, two wires, or lines, are used. One line transmits the normal signal (e.g., V) and the other line transmits a logically inverted version of the signal (e.g., ^V). A differential receiver subtracts the inverted signal from the normal signal, thus canceling out any common mode noise induced in the lines, on the assumption that the same level of noise has been introduced into both lines.

A differential protocol provides better noise immunity than a single-ended protocol, and thus is typically used when driving long line lengths in electrically noisy environments. The disadvantage of using a differential-mode bus is that it requires twice as many signal lines as a single-ended bus. A system may be designed with the assumption that a differential bus is required. In the actual system environment, it may turn out that the environment is not as noisy as initially anticipated. Therefore, the differential-mode bus is not needed for noise immunity, and the extra signal lines are unnecessary. If it is determined that the differential-mode bus is not needed, it is not possible to change the bus to be configured as a single-ended bus.

Conversely, a system may be designed with the assumption that a single-ended bus is required. In the actual system environment, it may turn out that the system is not functioning correctly, due to noise in the environment. If it is determined that a differential-mode bus is desirable, rather than a single-ended bus, it is not possible to change the bus configuration.

Consequently, it would be desirable to have a method and apparatus for configuring a bus as either a single-ended mode bus or as a differential mode bus, depending on the system environment. It would also be desirable to configure the bus in such a way that additional lines are not required, and so that substantially the same circuitry may be used for either single-ended mode or differential mode. It would further be desirable to allow a selectable-mode driver to be connected to a non-selectable mode receiver, and vice versa.

SUMMARY OF THE INVENTION

Accordingly, the present invention is directed to a method and apparatus for configuring a bus as either a single-ended mode bus or as a differential mode bus, depending on the system environment. The bus is configured in such a way that additional lines are not required, and so that substantially the same circuitry may be used for either single-ended mode or differential mode. Further, a selectable-mode driver may be connected to a non-selectable mode receiver, and vice versa.

The present invention may be implemented as a selectable driver, a selectable receiver, or a selectable driver/receiver pair. The apparatus and method of the present invention apply to both uni-directional and bi-directional bus implementations. The invention uses the same bus lines (i.e. wires) and substantially the same circuitry for both single-ended and differential modes of operation. When operating in single-ended mode, the data width of the bus is twice the data width as when operating in differential mode.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
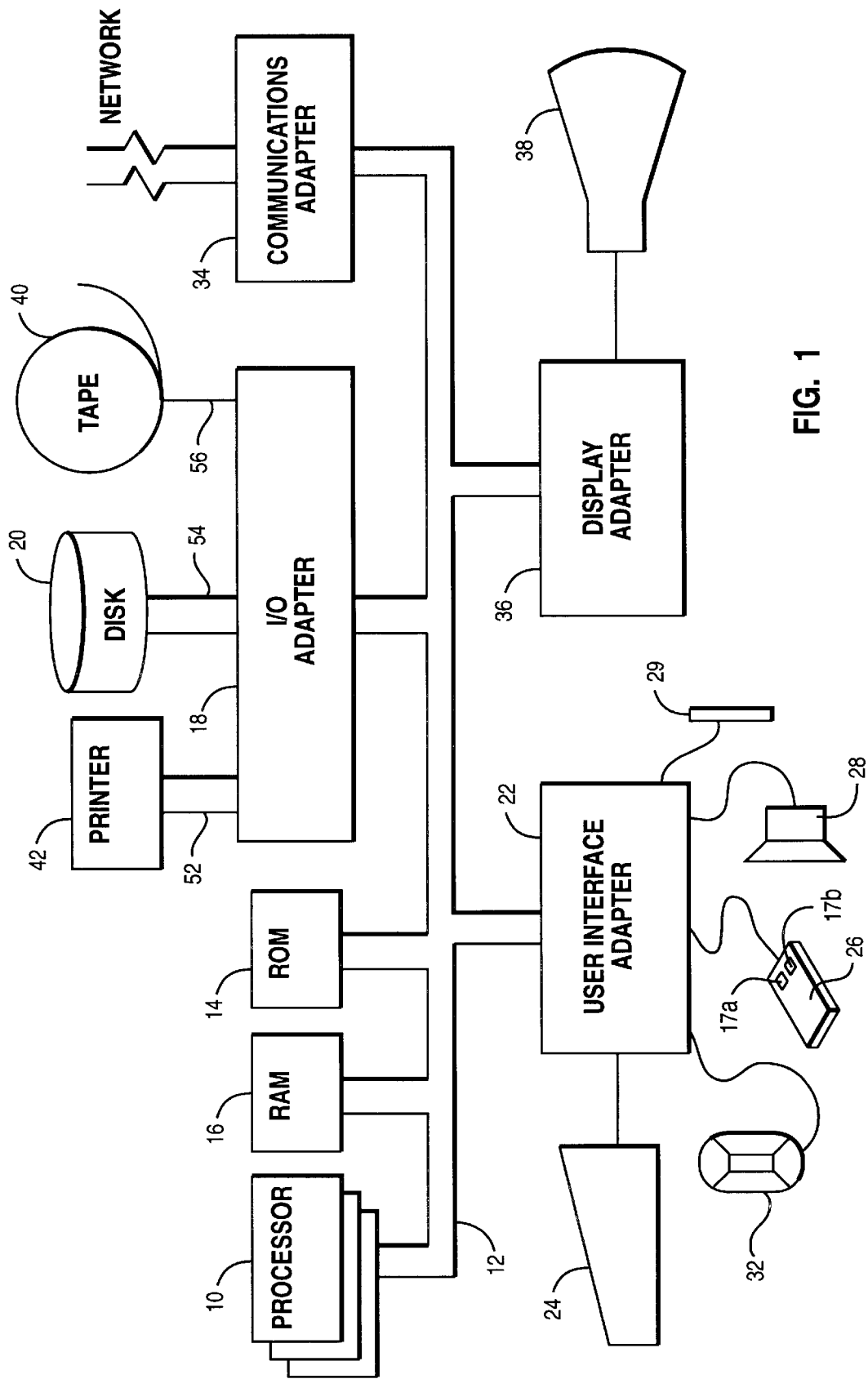
FIG. 1 is a block diagram of an information handling system on which the present invention may be implemented.

The invention may be implemented on a variety of hardware platforms, including personal computers, workstations, mini-computers, and mainframe computers. Referring now to FIG. 1, a typical configuration of an information handling system that may be used to practice the novel method of the present invention will be described. The computer system of FIG. 1 has at least one processor 10. Processor 10 typically contains one or more internal busses (not shown). Processor 10 is also interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1 with hundreds or even thousands of similar systems, or other devices, such as remote printers, remote servers, or remote storage units. The system depicted in FIG.

1 may be linked to both local area networks (sometimes referred to as intranets) and wide area networks, such as the Internet.

As discussed above, in the background of the invention section herein, a differential-mode bus, including differential pair drivers, bus signals, and receivers, can be used to provide better noise immunity as compared to a single-ended (i.e. non-differential) mode bus, including single-ended drivers, bus signals, and receivers. A differential bus protocol is typically used when driving long line lengths in electrically noisy environments. However, one disadvantage of using a differential mode bus is that it requires twice as many signal lines as a single-ended mode bus. The present invention is a driver/bus/receiver combination which can be used in either differential mode or single-ended mode. The present invention may be used for any type of bus, such as system bus 12, or for busses 52, 54, and 56 which connect peripheral devices printer 42, disk 20, and tape drive 40 to I/O adapter 18.

The present invention may be implemented as a selectable driver, a selectable receiver, or a selectable driver/receiver pair. The apparatus and method of the present invention apply to both uni-directional and bi-directional bus implementations. Further, a selectable circuit (i.e. a selectable driver, receiver, or driver/receiver pair) may be connected, via a bus, to a corresponding selectable or non-selectable circuit, as described below with reference to FIGS. 5A, 5B, and 5C. The invention uses the same bus lines (i.e. wires) and substantially the same circuitry for both single-ended and differential modes of operation. When operating in single-ended mode, the data width of the bus is twice the data width as when operating in differential mode.

Figure 2:
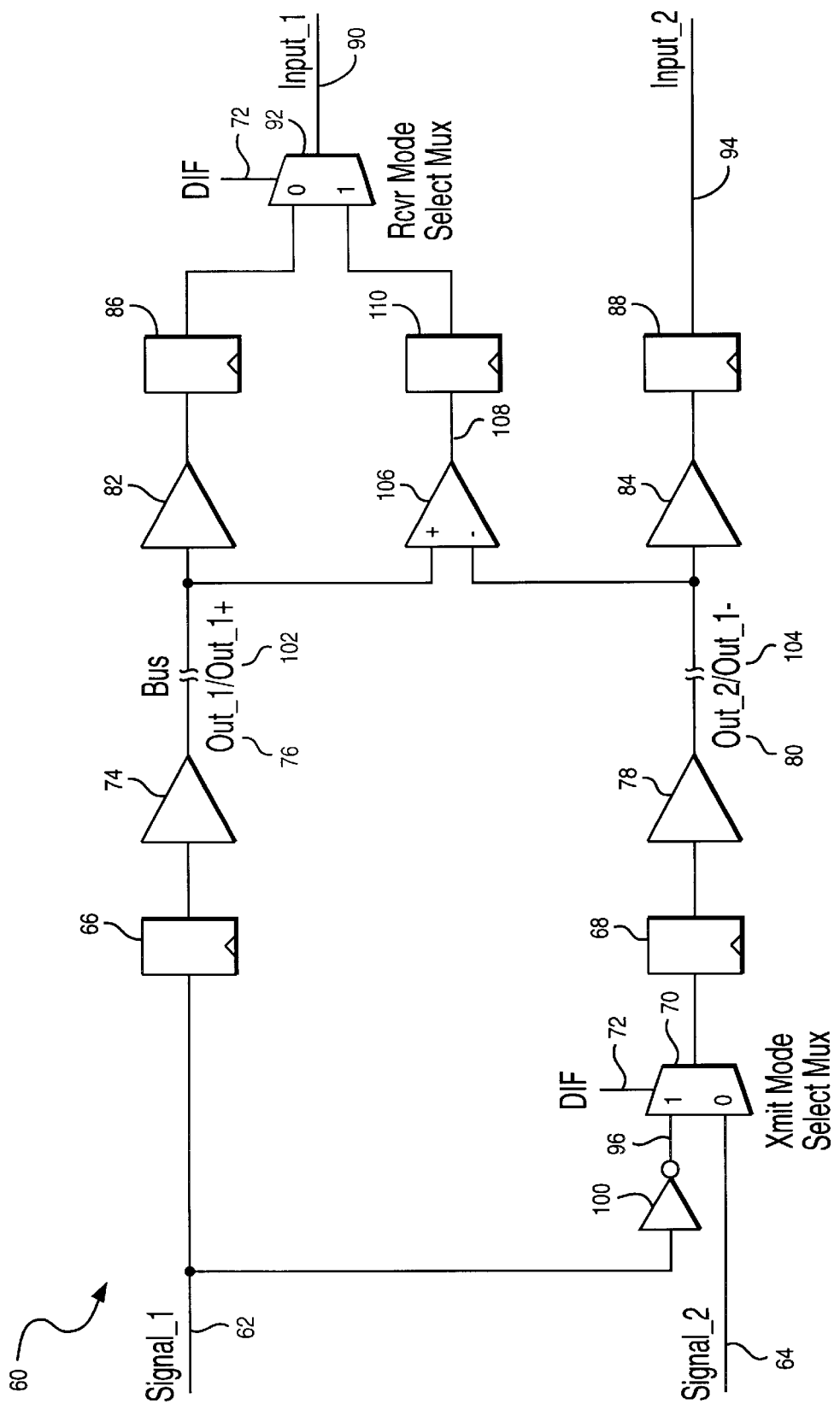
FIG. 2 is a circuit diagram of a combination single-ended and differential driver/receiver pair with input and output latches according to one embodiment of the present invention.

FIG. 2 is a circuit diagram illustrating one embodiment of the present invention. Referring now to FIG. 2, circuit 60 is shown, which can be configured as either a two-bit single-ended mode driver/receiver system, or a one-bit differential mode driver/receiver system. For a 64-bit bus, this circuit is repeated 64 times. When circuit 60 is operated in single-ended (i.e. non-differential) mode, two sources, Signal__1 62 and Signal__2 64 are latched into output latches 66 and 68, respectively. Signal__1 62 is driven by driver 74 as bus signal Out__1 76. Signal__2 64 is selected by Transmit Mode Select Multiplexer 70 when DIF signal 72 is set to zero. Setting DIF signal 72 to zero indicates that the bus is operating in single-ended mode, and that Signal__1 62 and Signal__2 64 are independent signals from each other, each carrying independent data. After being selected by Transmit Mode Select Multiplexer 70, Signal__2 64 is latched into output latch 68, and then driven by driver 78 as bus signal Out__2 80.

At the receiving end, two separate single-ended receivers, 82 and 84, are used to feed input latches 86 and 88. The data from input latch 86 is selected as Input__1 90 using Receiver Mode Select Multiplexer 92 when DIF signal 72 is set to zero. The data from input latch 88 is received as Input__2 94 directly from input latch 88.

When operating in differential mode, a single source, Signal__1 62, is latched to output latch 66, while its complement 96, is generated through inverter 100. Complement 96 is selected by Transmit Mode Select Multiplexer 70 when DIF signal 72 is equal to one. Setting DIF signal 72 to one indicates that the bus is operating in differential mode, and that complement 96 is the inverted signal of Signal__1 62. Signal__1 62 is driven by driver 74 as bus signal Out__1+ 102. After being selected by Transmit Mode Select Multiplexer 70, complement 96 is latched into output latch 68, and then driven by driver 78 as the complement or differential output, referred to as bus signal Out__1− 104.

At the receiving end, differential receiver 106 receives the differential pair, Out__1+ 102 and Out__1− 104. Differential receiver 106 subtracts the negative input, Out__1− 104, from the positive input, Out__1+ 102. The resulting voltage, if greater than zero, generates a logical "1" voltage on output result 108, and if less than zero, generates a logical "0" voltage on output result 108. Resulting output signal 108 is latched into input latch 110. The data from input latch 110 is selected as Input__1 90 using Receiver Mode Select Multiplexer 92 when DIF signal 72 is set to one. In differential mode, Input__2 94 is not used, and is ignored by the receiving system.

Figure 3:
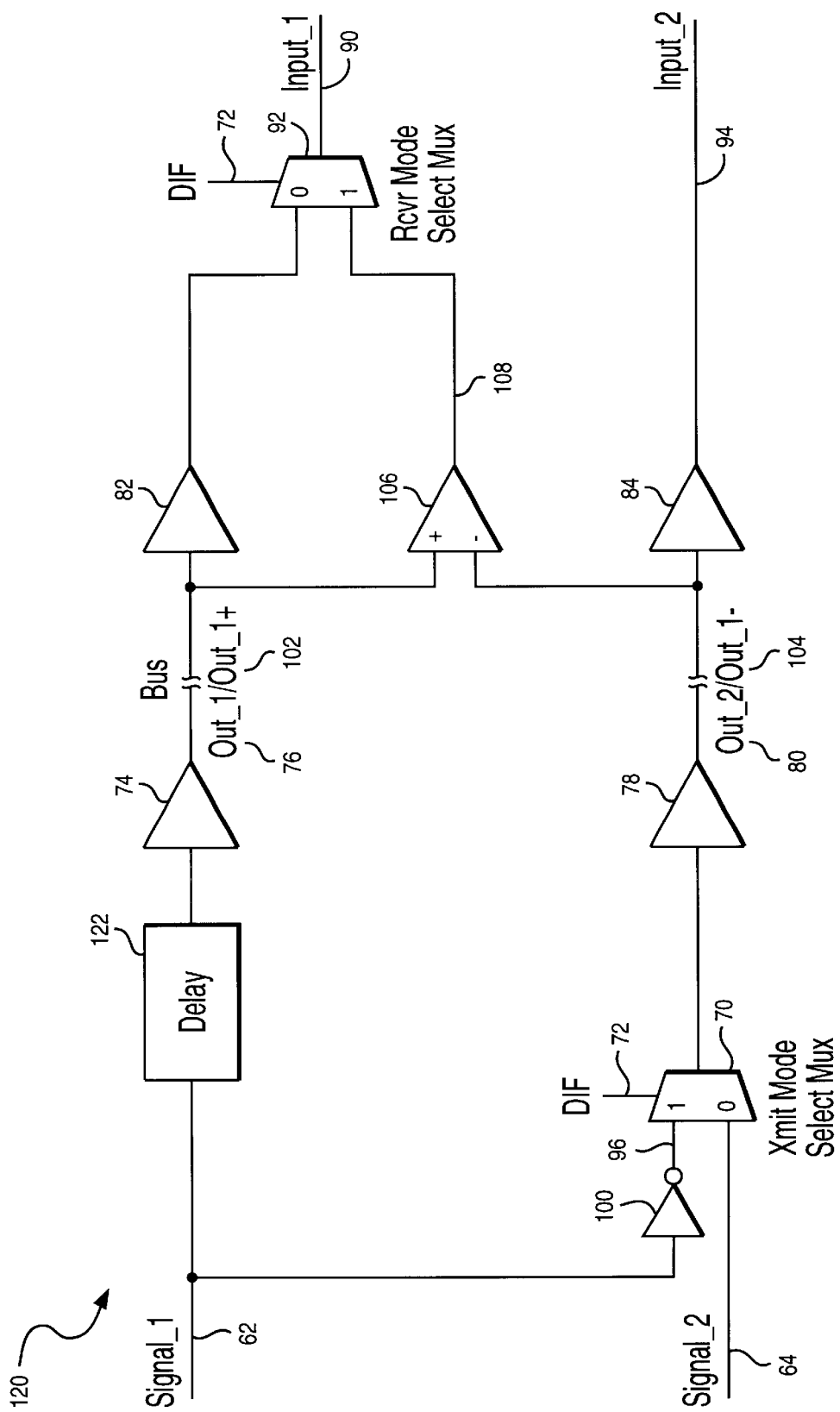
FIG. 3 is a circuit diagram of a combination single-ended and differential driver/receiver pair without input and output latches according to an alternate embodiment of the present invention.

In another embodiment of the invention, a circuit similar to the circuit described in FIG. 2 may be used, without the output and input latches. Referring now to FIG. 3, circuit 120 will be described. Circuit 120 includes many of the same circuit elements as circuit 60, described above with reference to FIG. 2. Circuit 120 also operates in substantially the same manner as circuit 60. However, because there are no output or input latches (elements 66, 68, 86, 88, and 110 are not present in FIG. 3), circuit 120 operates somewhat differently when it is operating in differential mode. In differential mode, there is a delay associated with producing Out__1− 104. The delay is caused by delay through inverter 100 and Transmit ode Select Multiplexer 70. To compensate for this delay, it may be necessary to include delay path 122 in the Signal__1/Out__1+ path. Delay path 122 would be of a suitable length to equalize the delay caused by inverter 100 and Transmit Mode Select Multiplexer 70. In all other operations (i.e. transmitting in single-ended mode, and receiving in both differential and single-ended mode), circuit 120 operates in a similar manner as circuit 60, except that circuit 120 does not latch data.

Figure 4:
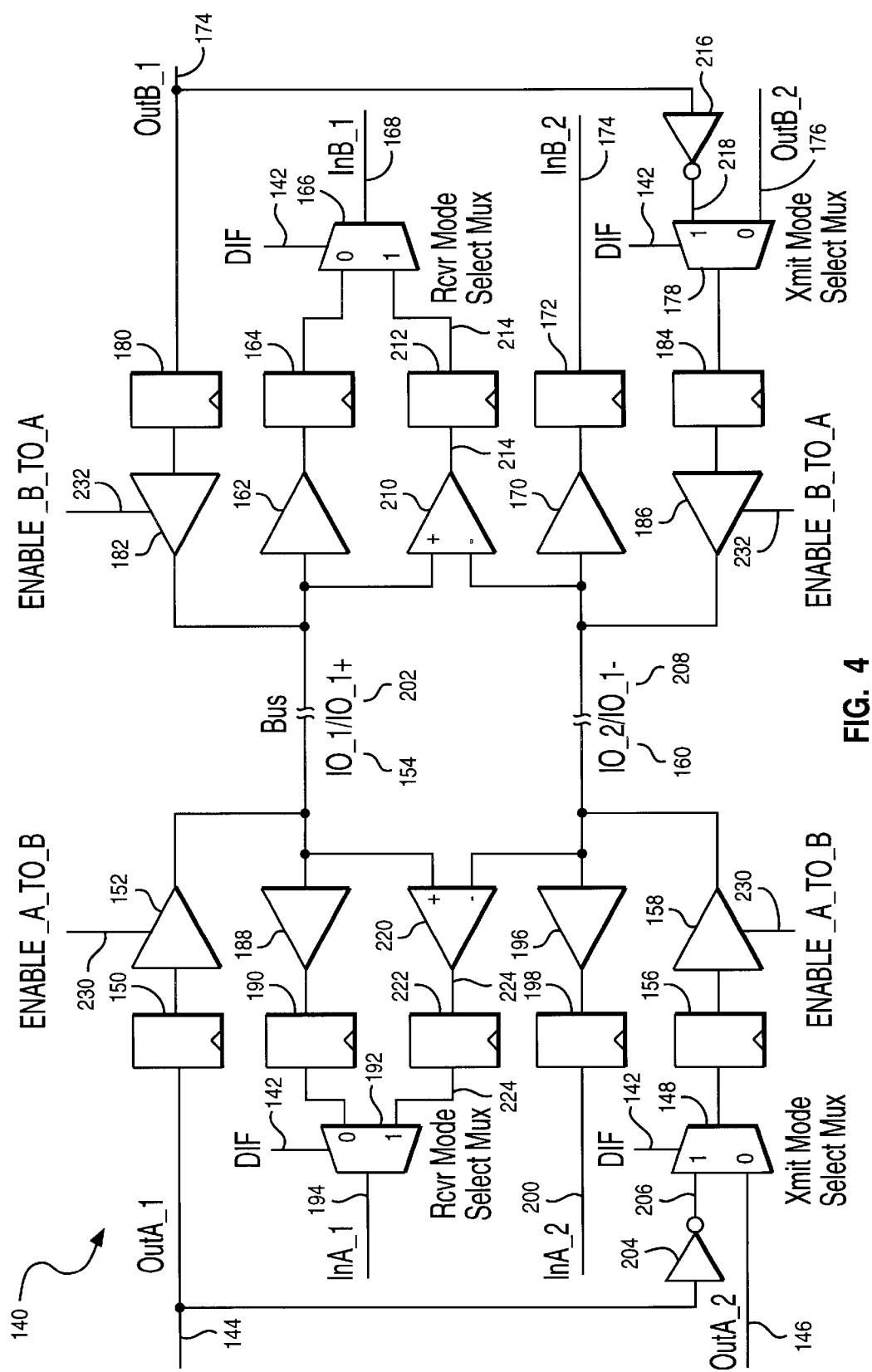
FIG. 4 is a circuit diagram of a combination single-ended and differential bi-directional driver/receiver pair with input and output latches.

The circuit and method of the present invention apply to both uni-directional and bi-directional bus implementations. FIG. 4 is a circuit diagram depicting a two-bit bi-directional non-differential driver/bus/receiver circuit, which can be configured as a one-bit differential driver/bus/receiver circuit. The embodiment depicted in FIG. 4 includes input and output latches, as described above with reference to FIG. 2. However, the bi-directional circuit shown in FIG. 4 could also be implemented without input and output latches, as described above with reference to FIG. 3.

Referring now to FIG. 4, a bi-directional driver/bus/receiver 140 will now be described. When operating in single-ended (i.e. non-differential) mode, DIF signal 142 is set to zero. OutA__1 144 and OutA__2 146 are the output signals which are transmitted in one direction, with OutA__2 146 being selected by Transmit Mode Select Multiplexer 148. OutA__1 144 is latched into output latch 150 and driven by driver 152 as IO__1 154. OutA__2 146 is latched into output latch 156 and driven by driver 158 as IO__2 160. Note that for bi-directional operation, drivers 152 and 158 are enabled by Enable__A__to__B signal 230, and drivers 183 and 186 are enabled by Enable__B__to__A signal 232. At the receiving end, IO__1 154 is received by receiver 162, latched into input latch 164, and selected by Receiver Mode Select Multiplexer 166 as InB__1 168. IO__2 160 is received by receiver 170 and latched into input latch 172. IB__2 174 is then generated directly from input latch 172.

OutB__1 174 and OutB__2 176 are the output signals transmitted in the other direction, with OutB__2 176 being selected by Transmit Mode Select Multiplexer 178. OutB__1 174 is latched into output latch 180 and driven by driver 182 as IO__1 154. OutB__2 176 is latched into output latch 184 and driven by driver 186 as IO__2 160. At the receiving end, IO__1 154 is received by receiver 188, latched into input latch 190, and selected by Receiver Mode Select Multiplexer 192 as IA__1 194. IO__2 160 is received by receiver 196 and latched into input latch 198. InA__2 200 is then generated directly from input latch 198.

When operating in differential mode, DIF signal 142 is set to one. OutA__1 144 is latched into output latch 150 and driven by driver 152 as IO__1+ 202. OutA__1 144 is also complemented by inverter 204. The complemented signal 206 is then selected by Transmit Mode Select Multiplexer 148, latched into output latch 156, and driven by driver 158 as IO__1− 208. At the receiving end, IO__1+ 202 and I__1− 208 are received by differential receiver 210, and the resulting signal 214 is latched into input latch 212. Signal 214 is then selected by Receiver Mode Select Multiplexer 166 as InB__1 168.

Similarly, in the other direction, OutB__1 174 is latched into output latch 180 and driven by driver 182 as IO__1+ 202. OutB__1 174 is also complemented by inverter 216. The complemented signal 218 is then selected by Transmit Mode Select Multiplexer 178, latched into output latch 184, and driven by driver 186 as IO__1− 208. At the receiving end, IO__1+ 202 and IO__1− 208 are received by differential receiver 220, and the resulting signal 224 is latched into input latch 222. Signal 224 is then selected by Receiver Mode Select Multiplexer 192 as InA__1 194.

Figure 5A:
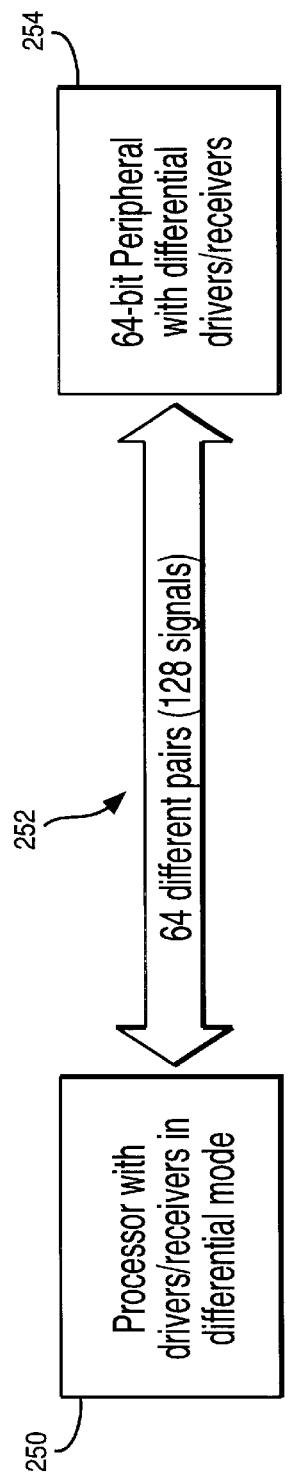
FIGS. 5A, 5B, and 5C are block diagrams illustrating various configurations for a device having selectable mode drivers/receivers.
Figure 5B:
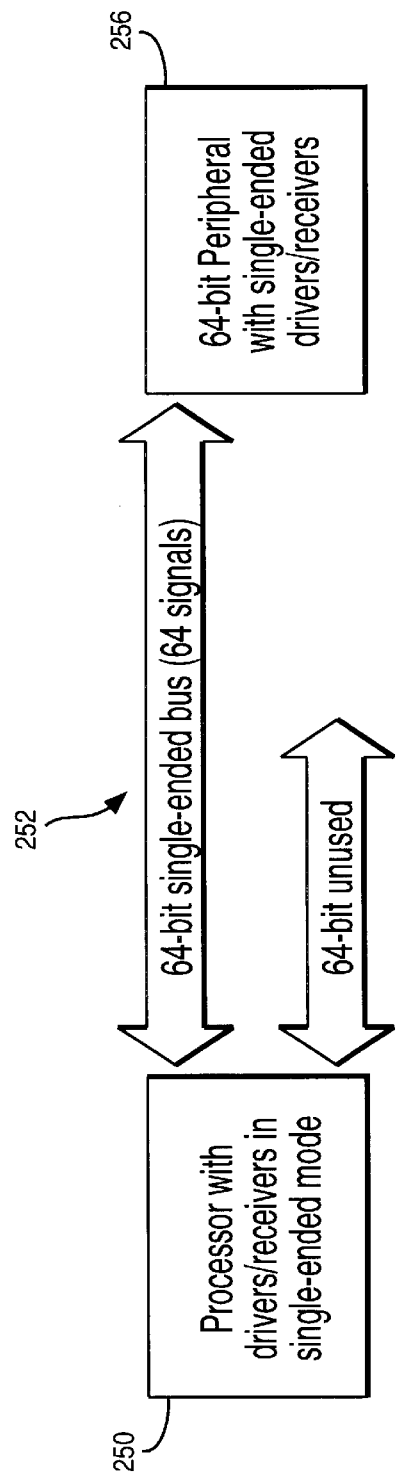
Figure 5C:
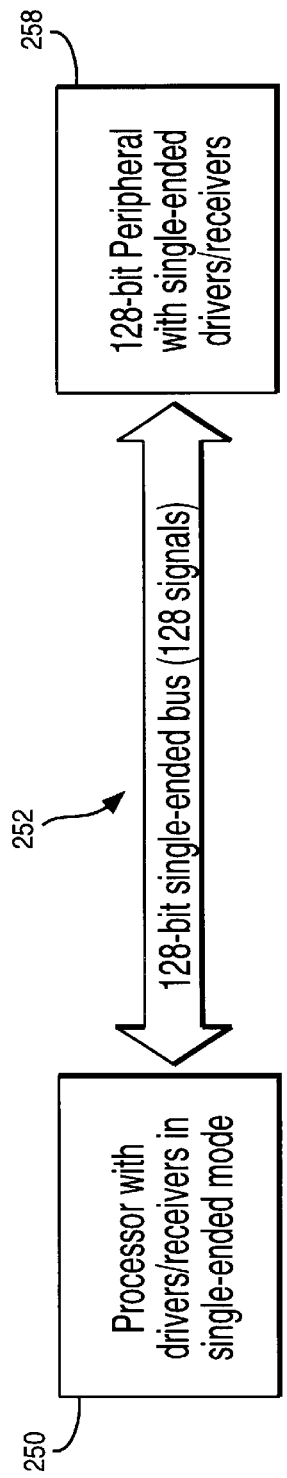

It may be desirable to connect a selectable-mode driver to a non-selectable mode receiver, and vice-versa. FIGS. 5A, 5B, and 5C illustrate several of the many possible configurations in which the present invention may be used. In FIGS. 5A, 5B, and 5C, processor 250 is a processor with selectable mode drivers/receivers, and bus 252 is a bi-directional bus with 128 signal lines (i.e. wires).

Referring now to FIG. 5A, processor 250 may be connected, via bus 252, to a 64-bit peripheral device 254 with differential drivers/receivers. In this example, the drivers/receivers of processor 250 would operate in differential mode, and bus 252 would transmit 64 differential pairs along its 128 lines. Referring now to FIG. 5B, processor 250 may be connected to a 64-bit peripheral device 256 with single-ended drivers/receivers. In this example, the drivers/receivers of processor 250 would operate in non-differential mode, and bus 252 would transmit 64 bits along 64 of its 128 lines. The remaining 64 lines would be unused. Referring now to FIG. 5C, processor 250 may be connected to a 128-bit peripheral device 258 with single-ended drivers/receivers. In this example, the drivers/receivers of processor 250 would operate in non-differential mode, and bus 252 would transmit 128 bits along its 128 lines.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A circuit for transmitting data in an information handling system, comprising:

a bus, wherein the data may be transmitted on said bus using either a single-ended protocol or a differential protocol;

a selectable driver circuit for driving the data on said bus, wherein said selectable driver circuit may be configured to drive the data according to either the single-ended protocol or the differential protocol, and wherein said selectable driver circuit uses substantially the same circuitry to drive the data regardless of which protocol is used;

a selectable receiver circuit for receiving the data from said bus, wherein said selectable receiver circuit may be configured to receive the data according to either the single-ended protocol or the differential protocol, and wherein said selectable receiver circuit uses substantially the same circuitry to receive the data regardless of which protocol is used; and a selection signal input to said selectable driver circuit and said selectable receiver circuit, wherein said selection signal determines whether said selectable driver circuit drives the data on said bus using the single-ended protocol or the differential protocol, and wherein said selection signal determines whether said selectable receiver circuit receives the data using the single-ended protocol or the differential protocol.

2. A circuit according to claim 1, wherein said selectable driver circuit comprises:

a first driver circuit for driving a first data signal on said bus;

a second driver circuit for driving a second data signal on said bus; and means responsive to said selection signal for determining whether the second data signal is a complement of the first data signal or is an independent signal.

3. A circuit according to claim 2, wherein said means responsive to said selection signal comprises a multiplexer.

4. A circuit according to claim 1, wherein said selectable receiver circuit comprises:

means for receiving a first data signal from said bus;

means for receiving a second data signal from said bus; and means responsive to said selection signal for determining whether the second data signal is subtracted from the first data signal.

5. A circuit according to claim 1, wherein the bus transmits data bi-directionally.

6. An adaptable communications apparatus, comprising:

a bus having first and second ends, a reference conductor for establishing a common potential at the first and second ends, and first and second conductors for conducting first and second signals from the first end to the second end;

a driver, operably coupled to the common potential and the first and second bus conductors, for transmitting the first and second signals, having first protocol circuitry with selectable first and second modes, wherein according to the first mode two independent signals are transmitted as the first and second signals, and according to the second mode two related signals, which logically represent two instances of a single signal, are transmitted as the first and second signal, and wherein said driver uses substantially the same circuitry for transmitting the first and second signals regardless of which mode is used; and a receiver, operably coupled to the second bus end, having second protocol circuitry for selecting between receiving the first and second signals transmitted according to the first and second modes, wherein said receiver uses substantially the same circuitry for receiving the first and second signals regardless of which mode is selected.

7. A method for transmitting data on a bus, comprising:

inputting the data to a selectable driver circuit, wherein the selectable driver circuit may be configured to drive the data according to either a single-ended protocol or a differential protocol, and wherein the selectable driver circuit uses substantially the same circuitry to drive the data regardless of which protocol is used;

inputting a selection signal to the selectable driver circuit and to a selectable receiver circuit, wherein the selection signal determines whether the selectable driver circuit drives the data on the bus using the single-ended protocol or the differential protocol, and wherein the selection signal determines whether the selectable receiver circuit receives the data using the single-ended protocol or the differential protocol; and receiving the data from the bus by the selectable receiver circuit, wherein the selectable receiver circuit may be configured to receive the data according to either the single-ended protocol or the differential protocol, and wherein the selectable receiver circuit uses substantially the same circuitry to receive the data regardless of which protocol is used.

8. A method according to claim 7, wherein said step of inputting the data to the selectable driver circuit comprises the steps of:

driving a first data signal on the bus through a first driver circuit;

driving a second data signal on the bus through a second driver circuit; and selecting whether the second data signal is a complement of the first data signal or is an independent signal.

9. A method according to claim 7, wherein said receiving step comprises:

receiving a first data signal from the bus;

receiving a second data signal from the bus; and determining whether the second data signal is subtracted from the first data signal.

10. A method according to claim 7, wherein the bus transmits data bi-directionally.

* * * * *